(12) United States Patent
Nishida et al.

(10) Patent No.: US 12,026,572 B2
(45) Date of Patent: Jul. 2, 2024

(54) NONCONTACT COMMUNICATION MEDIUM FOR RECORDING MEDIUM CARTRIDGE, RECORDING MEDIUM CARTRIDGE, AND METHOD FOR MANUFACTURING NONCONTACT COMMUNICATION MEDIUM FOR RECORDING MEDIUM CARTRIDGE

(71) Applicant: FUJIFILM CORPORATION, Tokyo (JP)

(72) Inventors: Kenji Nishida, Kanagawa (JP); Toru Nakao, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/048,039

(22) Filed: Oct. 20, 2022

(65) Prior Publication Data

US 2023/0140361 A1     May 4, 2023

(30) Foreign Application Priority Data

Oct. 29, 2021    (JP) .................................. 2021-178341

(51) Int. Cl.
    *G06K 19/077*      (2006.01)
(52) U.S. Cl.
    CPC .............................. *G06K 19/07775* (2013.01)
(58) Field of Classification Search
    CPC ............................................... G06K 19/07775
    See application file for complete search history.

(56) References Cited

U.S. PATENT DOCUMENTS

| 2014/0167263 | A1* | 6/2014 | Wu ....................... H01L 21/565 |
| | | | 257/773 |
| 2015/0269474 | A1* | 9/2015 | Finn ....................... B23K 26/40 |
| | | | 216/13 |
| 2018/0013386 | A1* | 1/2018 | Arai .......................... H03L 7/00 |
| 2019/0378957 | A1* | 12/2019 | El-Ghoroury ....... C23C 18/2066 |
| 2021/0012804 | A1* | 1/2021 | Nakashio ............... G11B 23/30 |
| 2021/0056374 | A1* | 2/2021 | Lotya ....................... H04B 5/77 |
| 2021/0182650 | A1* | 6/2021 | Lotya ....................... H04B 5/22 |
| 2021/0217441 | A1* | 7/2021 | Nakashio ........... G11B 5/00813 |

FOREIGN PATENT DOCUMENTS

| JP | 2001-266534 A | 9/2001 |
| WO | 2019/193829 A1 | 10/2019 |

* cited by examiner

*Primary Examiner* — Thien M Le
*Assistant Examiner* — Asifa Habib
(74) *Attorney, Agent, or Firm* — SOLARIS Intellectual Property Group, PLLC

(57) ABSTRACT

The noncontact communication medium for a recording medium cartridge includes a substrate, an IC chip that is electrically connected to one end and the other end of an antenna coil formed on the substrate and configured to induce power with application of a magnetic field from an outside, and a stress relaxing member that is provided between the IC chip and the substrate.

14 Claims, 13 Drawing Sheets

NONCONTACT COMMUNICATION MEDIUM FOR RECORDING MEDIUM CARTRIDGE, RECORDING MEDIUM CARTRIDGE, AND METHOD FOR MANUFACTURING NONCONTACT COMMUNICATION MEDIUM FOR RECORDING MEDIUM CARTRIDGE

CROSS-REFERENCE TO RELATED APPLICATION

This application claims priority from Japanese Patent Application No. 2021-178341, filed Oct. 29, 2021, the disclosure of which is incorporated herein by reference in its entirety.

BACKGROUND

Technical Field

A technique of the present disclosure relates to a noncontact communication medium for a recording medium cartridge, a recording medium cartridge, and a method for manufacturing a noncontact communication medium for a recording medium cartridge.

Related Art

WO2019/193829A describes a cartridge memory for a recording medium cartridge. The cartridge memory comprises a memory unit that has a memory capacity capable of storing management information regarding a second information recording medium configured to record information with a second data track number greater than a first data track number, and a capacity setting unit configured to be capable of setting a data storage area limited to a first capacity capable of storing management information regarding a first information recording medium configured to record information with the first data track number, in the memory unit.

JP2001-266534A described a single reel type tape cartridge in which one reel 2 with a tape 3 wound thereon is disposed inside a case body 1, and a noncontact memory cartridge M is disposed in a loading unit 10 provided inside the case body 1. In the tape cartridge, a loading slot 23 for loading the memory cartridge M from a case external surface is opened in a case peripheral wall facing the loading unit 10, an engagement structure that undetachably engages and fixes the memory cartridge M inserted into and loaded in the loading unit 10 is provided between the loading unit 10 and the memory cartridge M, and the memory cartridge M can be assembled later to the loading unit 10 from the case external surface side.

SUMMARY

An embodiment according to the technique of the present disclosure provides a noncontact communication medium for a recording medium cartridge, a recording medium cartridge, and a method for manufacturing a noncontact communication medium for a recording medium cartridge that enable relaxation of stress in an IC chip due to deformation of a substrate.

A first aspect according to the technique of the present disclosure is a noncontact communication medium for a recording medium cartridge comprising a substrate, an IC chip that is electrically connected to one end and the other end of an antenna coil formed on the substrate and configured to induce power with application of a magnetic field from an outside, and a stress relaxing member that is provided between the IC chip and the substrate.

A second aspect according to the technique of the present disclosure is the noncontact communication medium for a recording medium cartridge according to the first aspect, in which the stress relaxing member is formed of metal.

A third aspect according to the technique of the present disclosure is the noncontact communication medium for a recording medium cartridge according to the second aspect, in which the metal is the same as metal that forms the antenna coil.

A fourth aspect according to the technique of the present disclosure is the noncontact communication medium for a recording medium cartridge according to the second aspect or the third aspect, in which the metal is copper or a copper alloy.

A fifth aspect according to the technique of the present disclosure is the noncontact communication medium for a recording medium cartridge according to any one of the second aspect to the fourth aspect, in which the stress relaxing member is formed as a print pattern.

A sixth aspect according to the technique of the present disclosure is the noncontact communication medium for a recording medium cartridge according to any one of the first aspect to the fifth aspect, in which the IC chip has a quadrangular shape in plan view, and the stress relaxing member is provided at positions corresponding to four corners of the IC chip in plan view of the IC chip.

A seventh aspect according to the technique of the present disclosure is the noncontact communication medium for a recording medium cartridge according to any one of the first aspect to the fifth aspect, in which the IC chip has a quadrangular shape in plan view, and the stress relaxing member is provided along opposite sides of the IC chip in plan view of the IC chip.

An eighth aspect according to the technique of the present disclosure is the noncontact communication medium for a recording medium cartridge according to any one of the first aspect to the fifth aspect, in which the stress relaxing member is provided at a position corresponding to a whole of the IC chip in plan view of the IC chip.

A ninth aspect according to the technique of the present disclosure is the noncontact communication medium for a recording medium cartridge according to any one of the first aspect to the fifth aspect, in which the stress relaxing member is provided at a position corresponding to an outer peripheral portion of the IC chip in plan view of the IC chip.

A tenth aspect according to the technique of the present disclosure is the noncontact communication medium for a recording medium cartridge according to any one of the first aspect to the ninth aspect, in which the IC chip has a storage capacity of equal to or greater than 32 kB.

An eleventh aspect according to the technique of the present disclosure is the noncontact communication medium for a recording medium cartridge according to any one of the first aspect to the tenth aspect, in which a ratio of a maximum outer shape dimension of the IC chip to a long side dimension of the substrate is equal to or greater than 25%.

A twelfth aspect according to the technique of the present disclosure is the noncontact communication medium for a recording medium cartridge according to any one of the first aspect to the eleventh aspect, in which the substrate is a flexible substrate.

A thirteenth aspect according to the technique of the present disclosure is a recording medium cartridge comprising the noncontact communication medium for a recording medium cartridge according to any one of the first aspect to the twelfth aspect.

A fourteenth aspect according to the technique of the present disclosure is a method for manufacturing a noncontact communication medium for a recording medium cartridge, the method comprising forming a stress relaxing member on a substrate, and mounting an IC chip electrically connectable to one end and the other end of an antenna coil formed on the substrate and configured to induce power with application of a magnetic field from an outside, on the substrate through the stress relaxing member.

DETAILED DESCRIPTION

Figure 1:
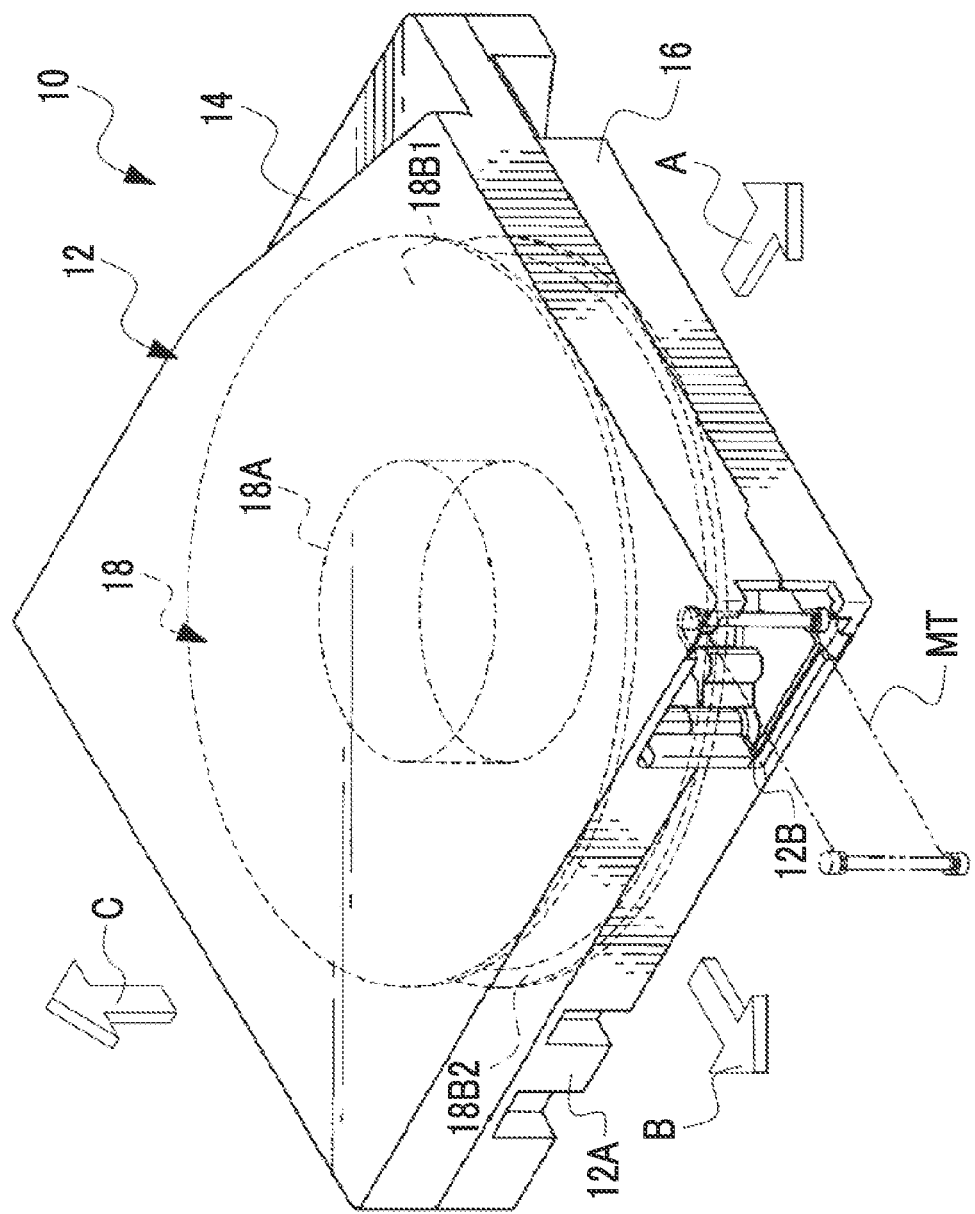
FIG. 1 is a schematic perspective view showing an example of the appearance of a magnetic tape cartridge according to an embodiment.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier".

In the following description, for convenience of description, in FIG. 1, a loading direction of a magnetic tape cartridge 10 in a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

As shown in FIG. 1 as an example, the magnetic tape cartridge 10 has a substantially rectangular shape in plan view, and comprises a box-shaped case 12. The magnetic tape cartridge 10 is an example of a "recording medium cartridge" according to the technique of the present disclosure. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be molded integrally.

An opening 12B is formed on a front side of a right wall 12A of the case 12. The magnetic tape MT is pulled out from the opening 12B.

Figure 2:
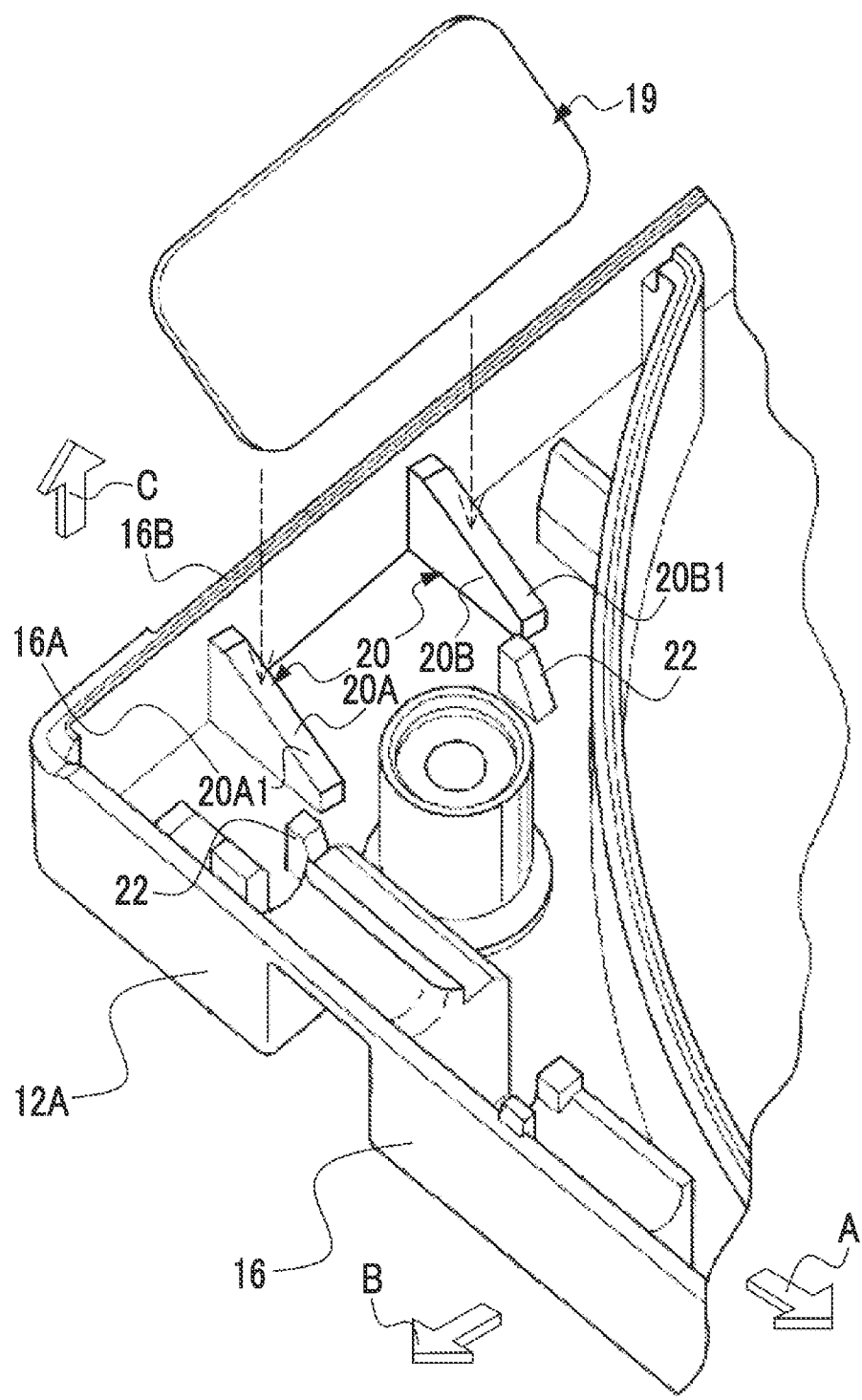
FIG. 2 is a schematic perspective view showing an example of the structure of a rear right end portion inside a lower case of the magnetic tape cartridge according to the embodiment.

As an example, as shown in FIG. 2, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

Management information is stored in the cartridge memory 19. The management information is information for managing the magnetic tape cartridge 10. Examples of the management information include identification information capable of specifying the magnetic tape cartridge 10, a recording capacity of the magnetic tape MT, the outline of information (hereinafter, referred to as "recorded information") recorded on the magnetic tape MT, items of the recorded information, and information indicating a recording format and the like of the recorded information.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various kinds of information to the cartridge memory 19 in a noncontact manner. Although details will be described below, the cartridge memory 19 generates power with electromagnetic application to a magnetic field from the external device. Then, the cartridge memory 19 operates using the generated power and performs transfer of various kinds of information with the external device by performing communication with the external device through the magnetic field.

As an example, as shown in FIG. 2, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are modularized in an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. An inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
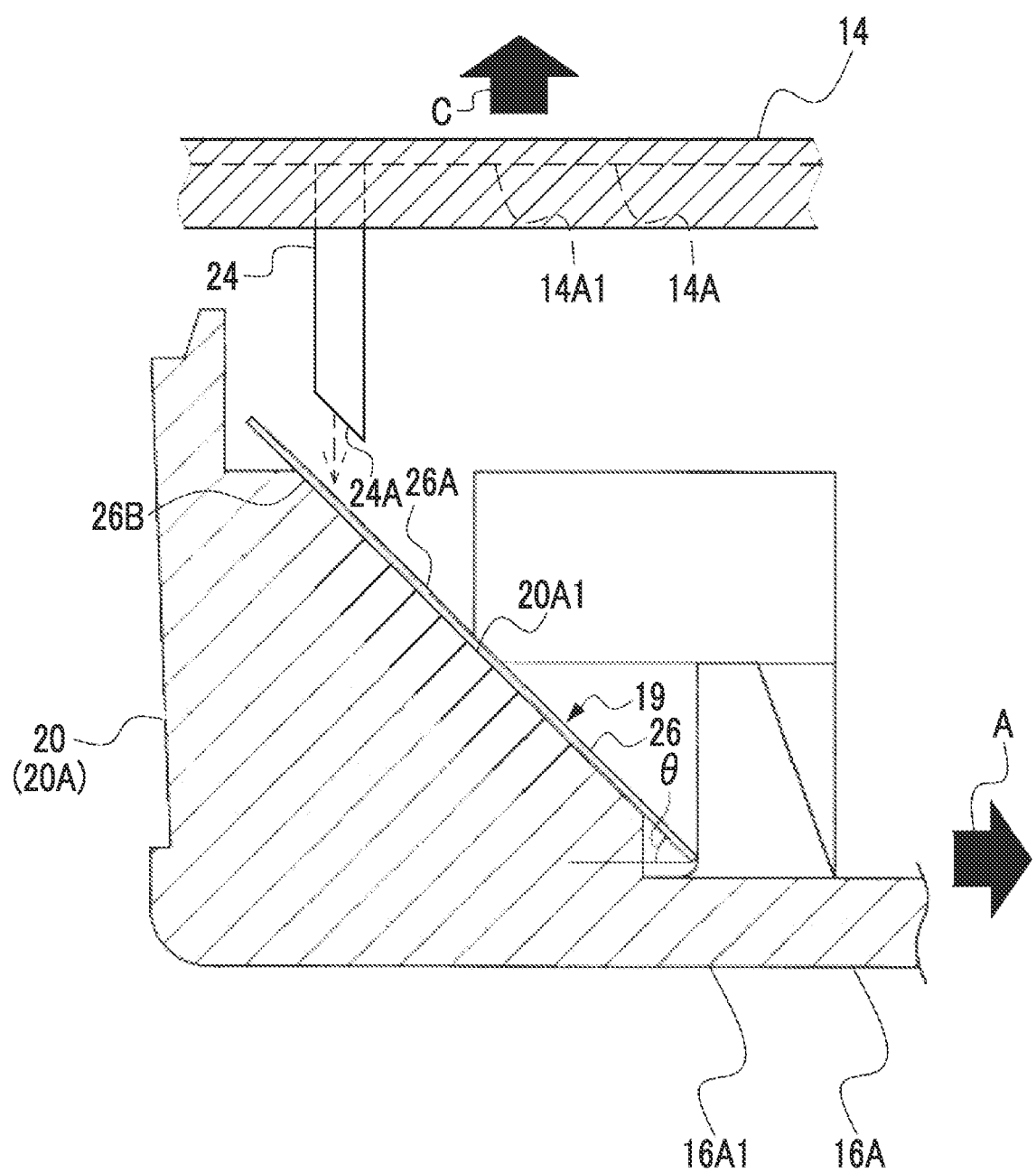
FIG. 3 is a side cross-sectional view showing an example of a support member provided on an inner surface of the lower case of the magnetic tape cartridge according to the embodiment.

As an example, as shown in FIG. 3, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle θ of the support member 20, that is, an inclination angle of each of the inclined surface 20A1 and the inclined surface 20B1 is 45 degrees with respect to the reference surface 16A1. The inclination angle of 45 degrees is merely an example, and may be in a range of "0 degrees<inclination angle θ<45 degrees" or may be equal to or greater than 45 degrees.

The cartridge memory 19 comprises a substrate 26. The substrate 26 is an example of a "substrate" according to the technique of the present disclosure. The substrate 26 is a flexible substrate. The substrate 26 has a quadrangular flat plate shape in which each corner portion is chamfered in an arc shape as an example. The substrate 26 has two surfaces in a thickness direction, that is, a front surface 26A and a back surface 26B. The substrate 26 is placed on the support member 20 such that the back surface 26B of the substrate 26 turns toward a lower side, and the support member 20 supports the back surface 26B of the substrate 26 from below. A part of the back surface 26B of the substrate 26 is in contact with the inclined surface of the support member 20, that is, the inclined surfaces 20A1 and 20B1, and the front surface 26A of the substrate 26 is exposed to an inner surface 14A1 side of a top plate 14A.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26A side, and the substrate 26 is pinched by the distal end surface 24A of each rib 24 and the inclined surface of the support member 20. With this, a position in an up-down direction of the cartridge memory 19 is restricted by the ribs 24.

Figure 4:
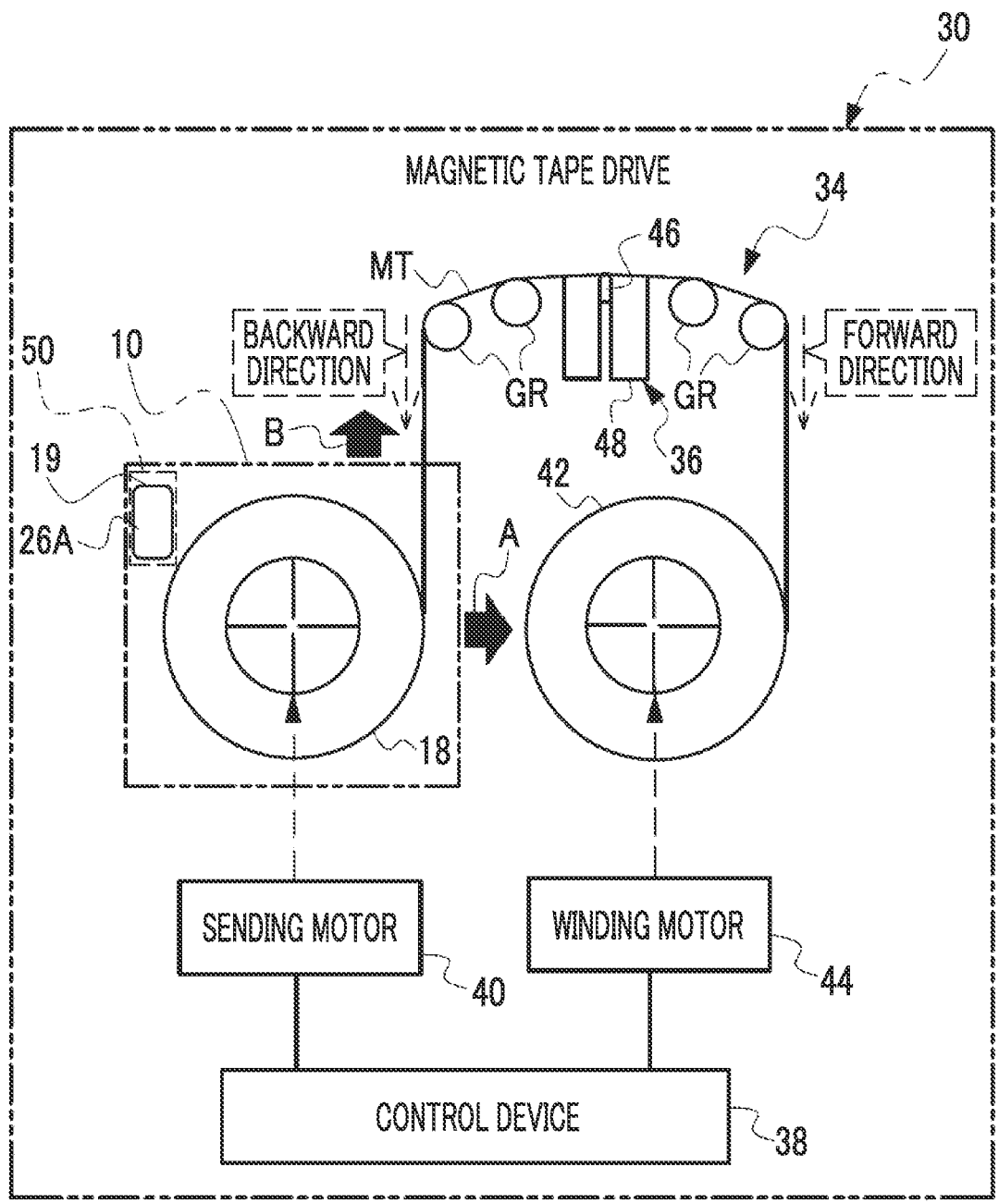
FIG. 4 is a schematic configuration diagram showing an example of the hardware configuration of the magnetic tape drive according to the embodiment.

As an example, as shown in FIG. 4, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear serpentine method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, a PLD, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. Rotation speeds, rotation torque, and the like of the sending motor 40 and the winding motor 44 are adjusted depending on a speed of the magnetic tape MT wound around the winding reel 42.

In a case where the magnetic tape MT is rewound to the cartridge reel 18, the sending motor 40 and the winding motor 44 are rotated by the control device 38 such that the magnetic tape MT runs in the backward direction. Rotation speeds, rotation torque, and the like of the sending motor 40 and the winding motor 44 are adjusted depending on a speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from at least one of a computer simulation, a test with a real machine, or the like as a range of tension in which data can be read from the magnetic tape MT by the reading head 36.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is an example of an "outside" according to the technique of the present disclosure. The noncontact reading and writing device 50 is disposed to confront the back surface 26B of the cartridge memory 19 below the magnetic tape drive 30 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of recorded information from the magnetic tape MT by the reading head 36 starts.

Figure 5:
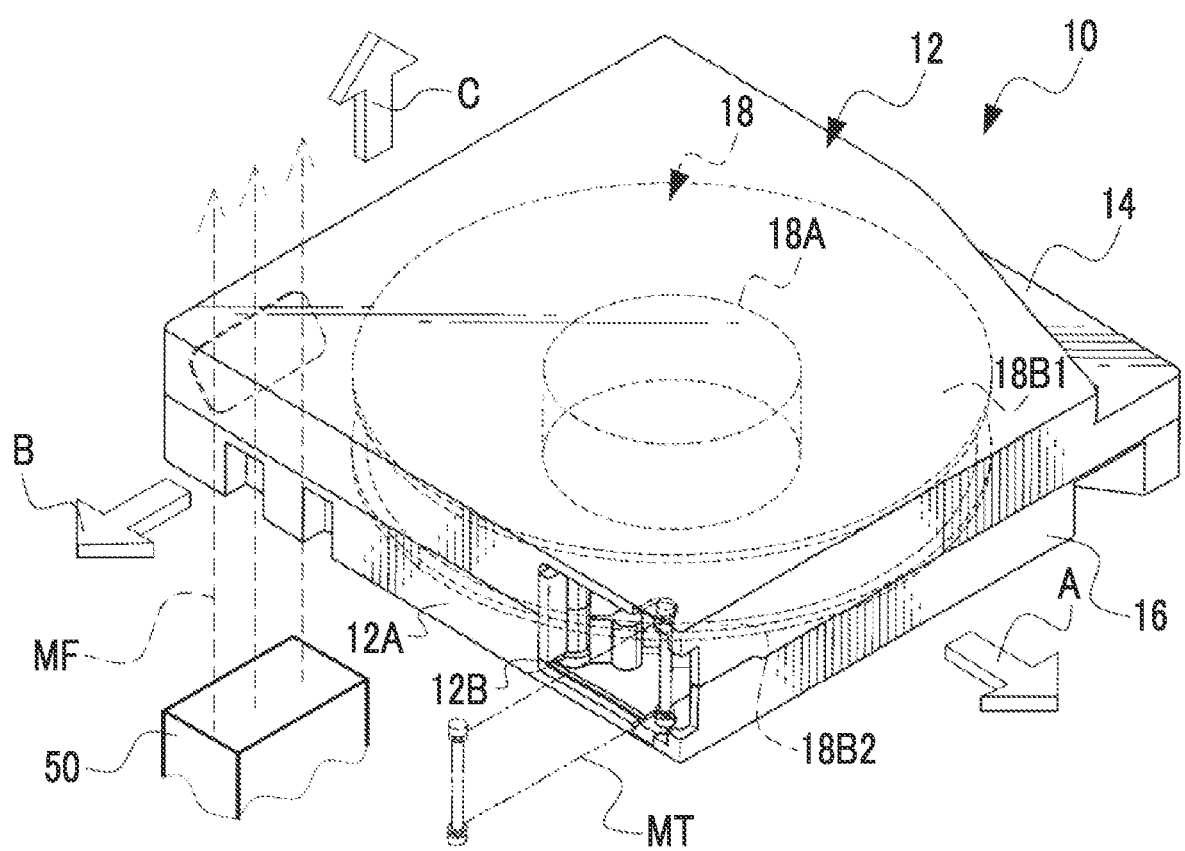
FIG. 5 is a schematic perspective view showing an example of an aspect in which a magnetic field is discharged from a lower side of the magnetic tape cartridge according to the embodiment by a noncontact reading and writing device.

As an example, as shown in FIG. 5, the noncontact reading and writing device 50 emits a magnetic field MF from below the magnetic tape cartridge 10 toward the cartridge memory 19. The magnetic field MF passes through the cartridge memory 19. The magnetic field MF is an example of a "magnetic field" according to the technique of the present disclosure.

Figure 6:
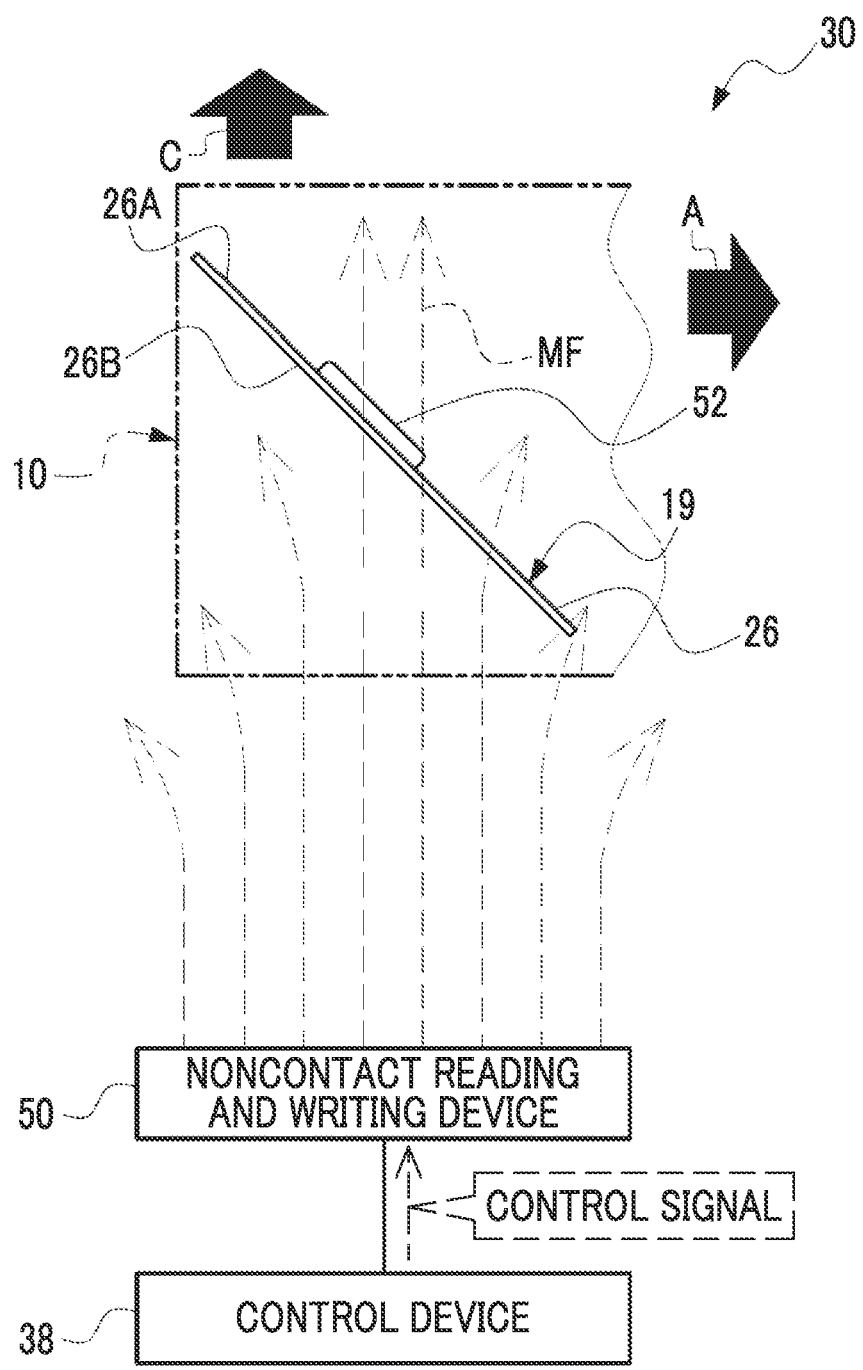
FIG. 6 is a conceptual diagram showing an example of an aspect in which a magnetic field is applied from the noncontact reading and writing device to a cartridge memory in the magnetic tape cartridge according to the embodiment.

As an example, as shown in FIG. 6, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in response to the control signal input from the control device 38. The magnetic field MF passes through the cartridge memory 19 from the back surface 26B side to the front surface 26A side.

The noncontact reading and writing device 50 spatially transmits a command signal to the cartridge memory 19 under the control of the control device 38. The command signal is a signal indicating a command to the cartridge memory 19. In a case where the command signal is spatially transmitted from the noncontact reading and writing device 50 to the cartridge memory 19, the command signal spatially transmitted from the noncontact reading and writing device 50 is included in the magnetic field MF in response to an instruction from the control device 38. In other words, the command signal is superimposed on the magnetic field MF. That is, the noncontact reading and writing device 50 transmits the command signal to the cartridge memory 19 through the magnetic field MF under the control of the control device 38.

Figure 7:
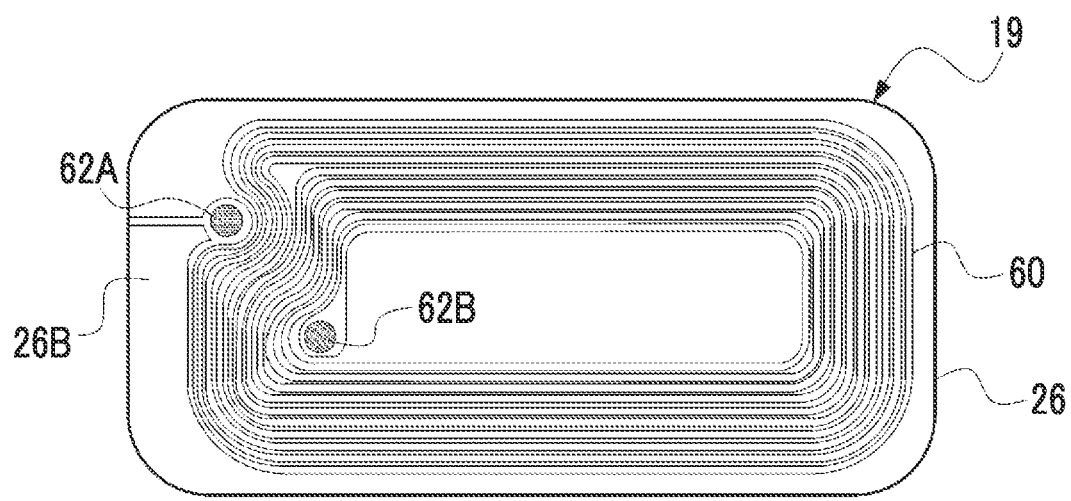
FIG. 7 is a bottom view showing an example of a back surface structure of the cartridge memory according to the embodiment.

As shown in FIG. 7 as an example, a coil 60 is formed in a loop shape on the back surface 26B of the cartridge memory 19. Here, as a material of the coil 60, copper foil is employed. The coil 60 induces an induced current with application of the magnetic field MF (see FIGS. 5 and 6) from the noncontact reading and writing device 50. Here, although an example where the coil 60 is formed on the back surface 26B of the cartridge memory 19 has been shown, this is merely an example, and the coil 60 may be formed to be buried in the substrate 26 of the cartridge memory 19. The coil 60 is an example of an "antenna coil" according to the technique of the present disclosure.

A first conduction portion 62A and a second conduction portion 62B are provided on the back surface 26B of the cartridge memory 19. The first conduction portion 62A and the second conduction portion 62B have solder, and electrically connect both end portions of the coil 60 to an IC chip 52 on the front surface 26A. The first conduction portion 62A and the second conduction portion 62B are an example of "one end and the other end of an antenna coil" according to the technique of the present disclosure.

Figure 8:
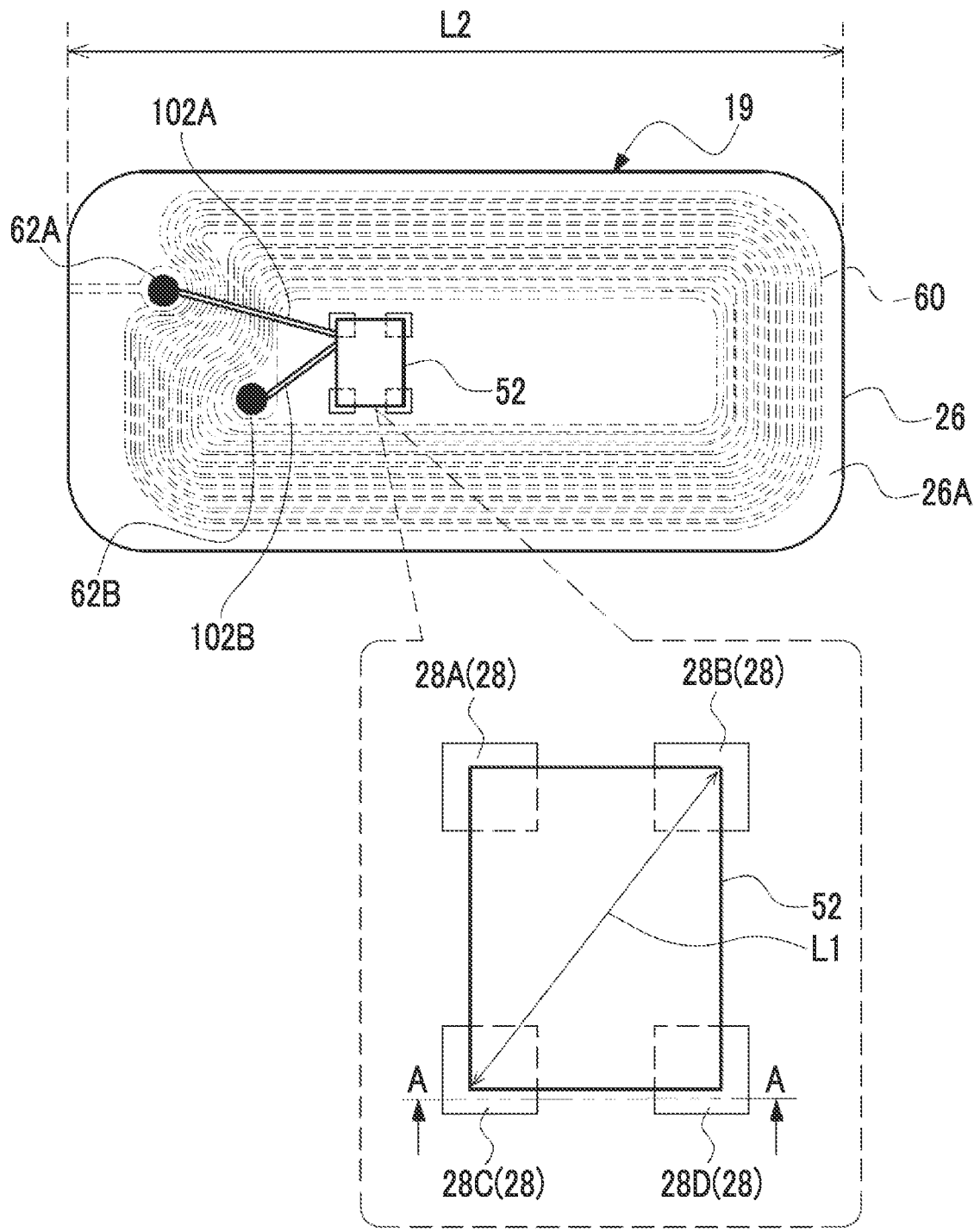
FIG. 8 is a top view showing an example of a front surface structure of the cartridge memory according to the embodiment.

As shown in FIG. 8 as an example, the IC chip 52 is mounted on the front surface 26A of the cartridge memory 19. On the front surface 26A of the cartridge memory 19, the IC chip 52 is electrically connected to the first conduction portion 62A and the second conduction portion 62B. Specifically, a first lead 102A that is one of a pair of leads protruding from the IC chip 52 is soldered to the first conduction portion 62A, and a second lead 102B that is the other lead of a pair of leads is soldered to the second conduction portion 62B. The IC chip 52 is an example of an "IC chip" according to the technique of the present disclosure.

As shown in FIG. 8 as an example, the IC chip 52 is mounted on the substrate 26 through a stress relaxing member 28. As shown in FIG. 8 as an example, the IC chip 52 has a quadrangular shape in plan view. The IC chip 52 has a maximum outer shape dimension L1 (that is, a length of a diagonal line) equal to or greater than 2.5 mm. Along side dimension L2 of the substrate 26 is 10 mm. Accordingly, a ratio (that is, L1/L2) of the maximum outer shape dimension L1 of the IC chip 52 to the long side dimension L2 of the substrate 26 is equal to or greater than 25%.

The stress relaxing member 28 is provided at positions corresponding to four corners of the IC chip 52 having a quadrangular shape in plan view of the IC chip 52. That is, four stress relaxing members 28 are provided, and stress relaxing members 28A, 28B, 28C, and 28D support the four corners of the IC chip 52, respectively.

As shown in FIG. 8 as an example, the stress relaxing members 28A, 28B, 28C, and 28D have a quadrangular shape. While an area of each of the stress relaxing members 28A, 28B, 28C, and 28D in plan view is not particularly limited, such an area that a region including each of the four corners of the IC chip 52 is supported and stress transmitted from the substrate 26 can be relaxed should be secured.

Figure 9:
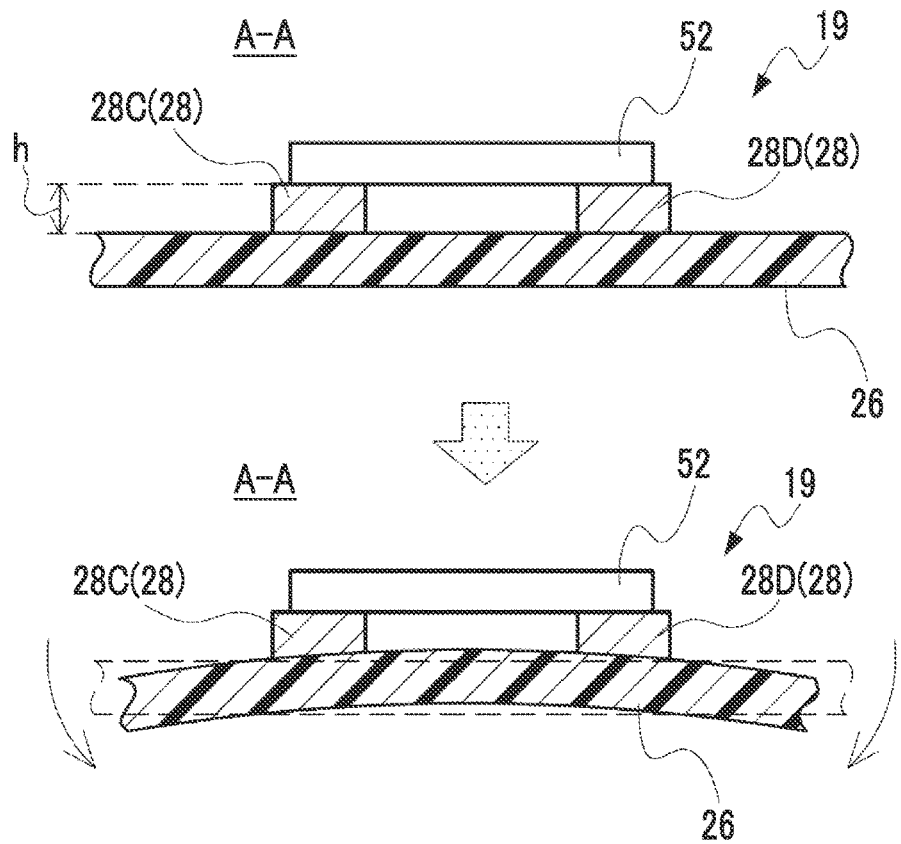
FIG. 9 is a sectional view of the cartridge memory shown in FIG. 8 taken along a line A-A.

As shown in FIG. 9 as an example, the stress relaxing member 28 is provided between the IC chip 52 and the substrate 26. The stress relaxing member 28 has a rectangular parallelepiped shape protruding from the substrate 26 toward the IC chip 52. A distance h (that is, a thickness of the stress relaxing member 28) at which the stress relaxing member 28 protrudes from the substrate 26 is about 30 μm. The IC chip 52 and the stress relaxing member 28 are adhered through an adhesive (not shown).

The stress relaxing member 28 is formed of metal as an example. Specifically, the stress relaxing member 28 is formed of the same metal as metal that forms the coil 60. "same" used herein indicates same in a meaning including an error that is generally allowed in the technical field to which the technique of the present disclosure belongs, in addition to completely same.

The stress relaxing member 28 is formed of copper foil as an example. While an ingredient of copper foil is not particularly limited, for example, single copper (that is, industrial native copper) may be used or a copper alloy in which copper is a main ingredient and other elements are added may be used.

The stress relaxing member 28 is further formed as a print pattern. That is, the stress relaxing member 28 is formed as a print pattern as well in a process in which the coil 60 is formed. Specifically, the stress relaxing member 28 is formed as a print pattern on the substrate 26 using a known photolithography technique.

As shown in FIG. 9 as an example, a case where bending stress with deflection to the substrate 26 is generated is considered. In this case, as shown in FIG. 9 as an example, the stress relaxing member 28 relaxes stress transmitted from the substrate 26. Specifically, the stress relaxing member 28 expands and contracts due to stress transmitted from the substrate 26 to relax stress. As a result, generation of stress to the IC chip 52 with deformation of the substrate 26 is suppressed.

The IC chip 52 comprises a computer (not shown). The computer comprises a CPU, an NVM, and a RAM (all are not shown). The program for a magnetic tape cartridge and the management information are stored in the NVM. The CPU controls the operation of the cartridge memory 19 by reading the program from the NVM and executing the program on the RAM. A storage capacity of the NVM is equal to or greater than 32 kB. That is, a storage capacity of the IC chip 52 is equal to or greater than 32 kB.

Next, a manufacturing process of the noncontact communication medium according to the embodiment will be described referring to FIG. 10.

Figure 10:
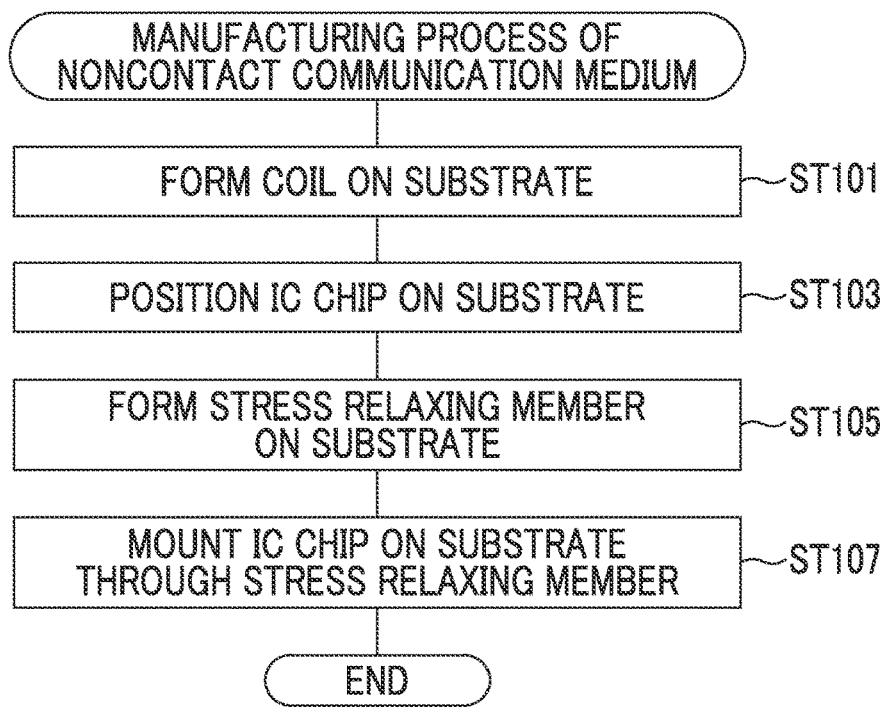
FIG. 10 is an explanatory view showing an example of a manufacturing method of the cartridge memory according to the embodiment.

In the manufacturing process of the noncontact communication medium shown in FIG. 10 as an example, first, in Step ST101, the coil 60 is formed on the substrate 26. Thereafter, the manufacturing process progresses to Step ST103.

In Step ST103, the IC chip 52 is positioned on the substrate 26. Thereafter, the manufacturing process progresses to Step ST105.

In Step ST105, the stress relaxing member 28 is formed on the substrate 26 based on a position of the IC chip 52 positioned in Step ST103. Thereafter, the manufacturing process progresses to Step ST107.

In Step ST107, the IC chip 52 is mounted on the substrate 26 through the stress relaxing member 28 formed in Step ST105. With this, the manufacturing process of the noncontact communication medium ends.

As described above, in the cartridge memory 19 according to the embodiment, the stress relaxing member 28 is provided between the IC chip 52 and the substrate 26. Therefore, according to this configuration, stress in the IC chip 52 due to deformation of the substrate 26 is relaxed, compared to a case where the IC chip 52 is attached directly onto the substrate 26.

In the cartridge memory 19, the stress relaxing member 28 is formed of metal. Therefore, according to this configuration, since ductility of metal is used for stress relaxation, stress in the IC chip 52 due to deformation of the substrate 26 is relaxed, compared to a case where the stress relaxing member 28 is formed of a material other than metal.

In the cartridge memory 19, the metal that forms the stress relaxing member 28 is the same as the metal that forms the coil 60. Therefore, according to this configuration, the stress relaxing member 28 is easily formed, compared to a case where metal different from the coil 60 is used as the stress relaxing member 28. As a result, improvement of the productivity of the cartridge memory 19 can be expected.

In the cartridge memory 19, the metal that forms the stress relaxing member 28 is copper or a copper alloy. Therefore, according to this configuration, the stress relaxing member 28 is easily formed, compared to a case where metal other than copper is a main ingredient as the stress relaxing member 28. As a result, improvement of the productivity of the cartridge memory 19 can be expected.

In the cartridge memory 19, the stress relaxing member 28 is formed as a print pattern. Therefore, according to this configuration, the stress relaxing member 28 is easily formed, compared to a case where the stress relaxing member 28 is attached as a separate component. As a result, improvement of the productivity of the cartridge memory 19 can be expected.

In the cartridge memory 19, the IC chip 52 has a quadrangular shape in plan view, and the stress relaxing member 28 is provided at the positions corresponding to the four corners of the IC chip 52 in plan view of the IC chip 52. Therefore, according to this configuration, stress due to deformation of the substrate 26 easily escapes and stress in the IC chip 52 is relaxed, compared to a case where the stress relaxing member 28 is provided in a central portion of the IC chip 52.

In the cartridge memory 19, the IC chip 52 has the storage capacity equal to or greater than 32 kB. Therefore, according to this configuration, compared to a case where the storage capacity of the IC chip 52 is less than 32 kB, even though the storage capacity of the IC chip 52 be equal to or greater than 32 kB to cause an increase in size of the IC chip 52, stress in the IC chip 52 due to deformation of the substrate 26 is relaxed.

In the cartridge memory 19, the ratio of the maximum outer shape dimension L1 of the IC chip 52 to the long side dimension L2 of the substrate 26 is equal to or greater than 25%. Therefore, according to this configuration, even though the IC chip 52 increases in size, stress in the IC chip 52 due to deformation of the substrate 26 is relaxed, compared to a case where the ratio of the maximum outer shape dimension L1 of the IC chip 52 to the long side dimension L2 of the substrate 26 is less than 25%.

In the cartridge memory 19, the substrate 26 is a flexible substrate. Therefore, according to this configuration, stress in the IC chip due to deformation of the substrate 26 is relaxed, compared to a case where the substrate 26 is a rigid substrate.

First Modification Example

In the above-described embodiment, although a form example where the stress relaxing member 28 is provided at the positions corresponding to the four corners of the IC chip 52 has been described, the technique of the present disclosure is not limited thereto. In a first modification example, as shown in FIG. 11 as an example, the stress relaxing member 28 is provided along opposite sides of the IC chip 52 in plan view of the IC chip 52.

Figure 11:
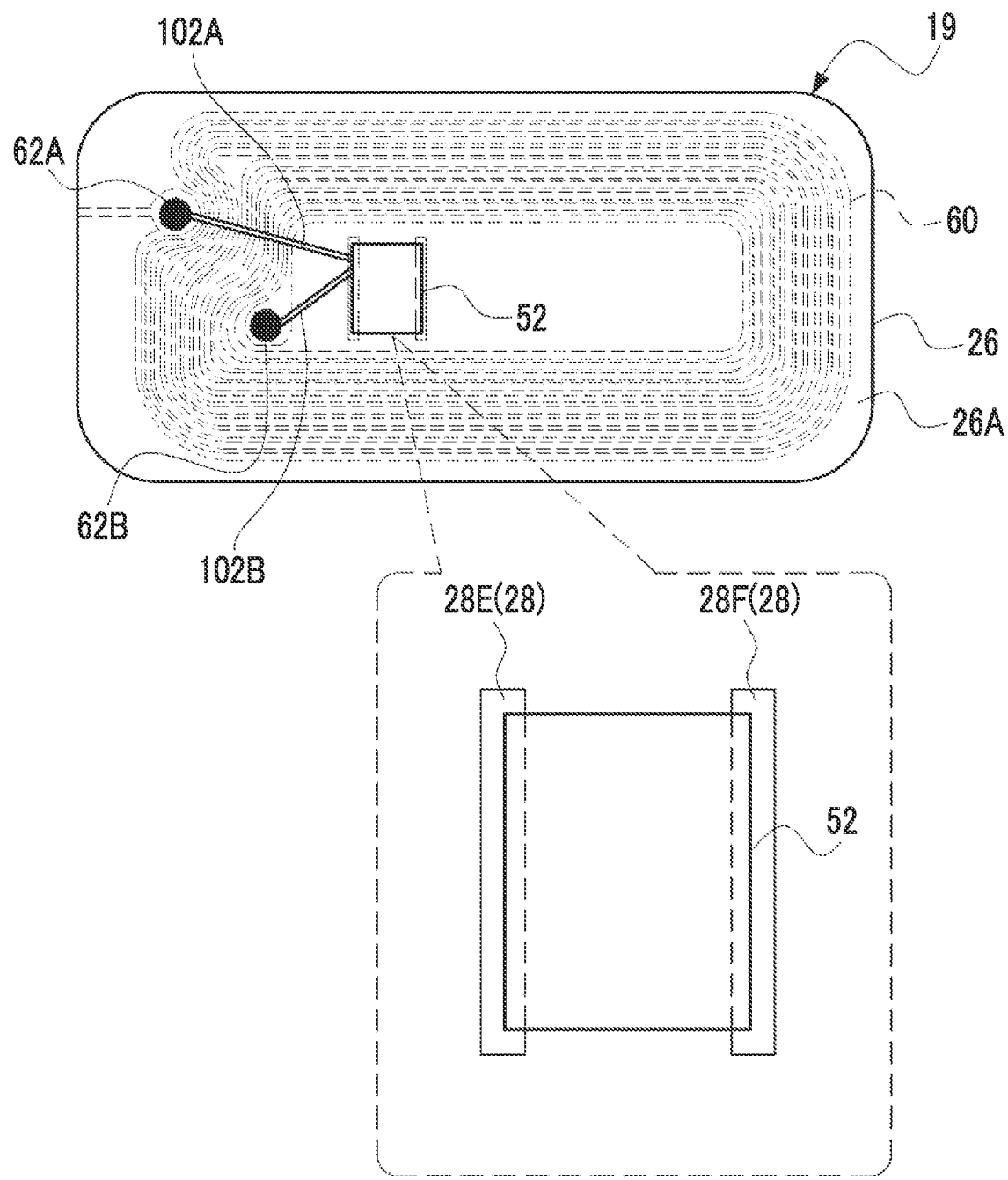
FIG. 11 is a top view showing an example of a front surface structure of a cartridge memory according to a modification example.

In the example shown in FIG. 11, stress relaxing members 28E and 28F are formed along a pair of long sides of the IC chip 52. The stress relaxing members 28E and 28F have a rectangular parallelepiped shape having long sides along the long sides of the IC chip 52. A length of each of the stress relaxing members 28E and 28F is set to be longer than a length of each of the long sides of the IC chip 52. A width of each of the stress relaxing members 28E and 28F is set to fall within a range including each of the long sides of the IC chip 52. That is, the stress relaxing members 28E and 28F support a pair of long sides of the IC chip 52.

As described above, in the cartridge memory 19 according to the first modification example, the IC chip 52 has a quadrangular shape in plan view, and the stress relaxing member 28 is provided along the opposite sides of the IC chip 52 in plan view of the IC chip 52. Therefore, according to this configuration, stress due to deformation of the substrate 26 easily escapes and stress in the IC chip 52 is relaxed, compared to a case where the stress relaxing member 28 is provided only in a part of the opposite sides of the IC chip 52.

In the first modification example, although a form example where the stress relaxing member 28 is provided along a pair of long sides of the IC chip 52 has been described, the technique of the present disclosure is not limited thereto. For example, the stress relaxing member 28 may be provided along a pair of short sides of the IC chip 52.

Second Modification Example

In the above-described embodiment, although a form example where the stress relaxing member 28 is provided partially with respect to the IC chip 52 has been described, the technique of the present disclosure is not limited thereto. In a second modification example, as shown in FIG. 12 as an example, the stress relaxing member 28 is provided at a position corresponding to the whole of the IC chip 52 in plan view of the IC chip 52.

Figure 12:
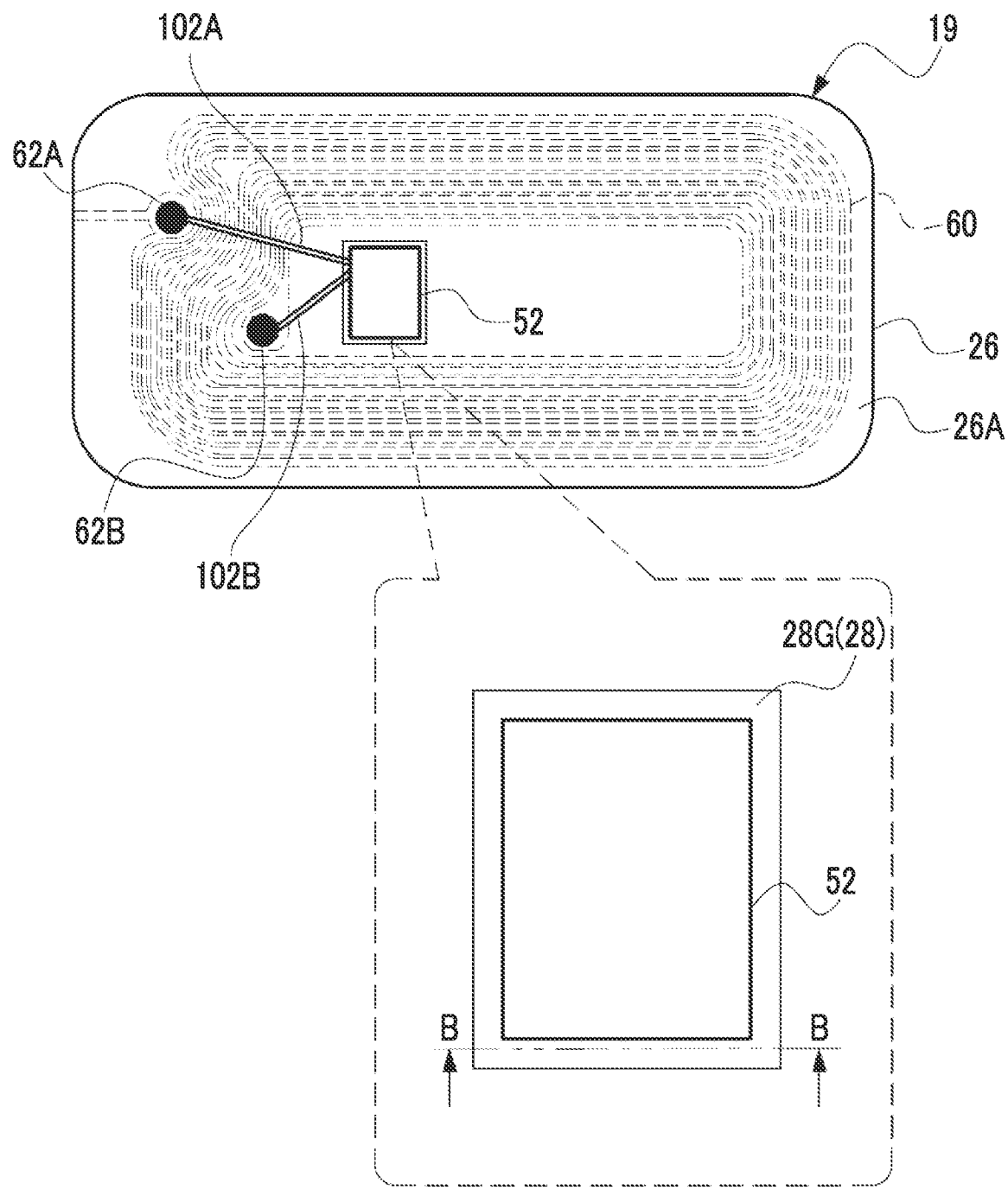
FIG. 12 is a top view showing an example of a front surface structure of a cartridge memory according to a modification example.

As shown in FIG. 12 as an example, a stress relaxing member 28G is formed in a flat plate shape. The stress relaxing member 28G has an area greater than the IC chip 52 in plan view of the IC chip 52. That is, the stress relaxing member 28G supports the whole surface of the IC chip 52 on the substrate 26 side.

Figure 13:
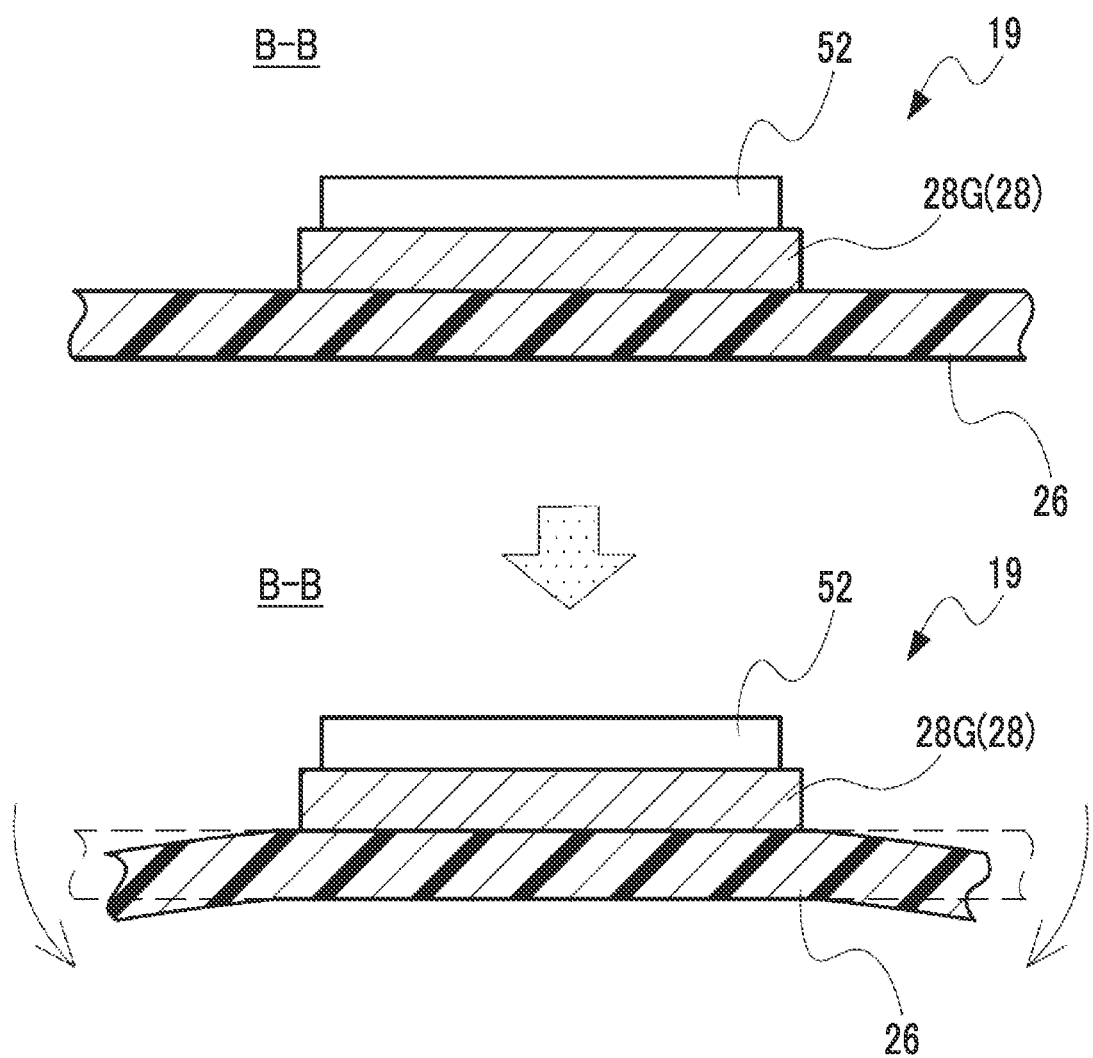
FIG. 13 is a sectional view of the cartridge memory shown in FIG. 12 taken along a line B-B.

As shown in FIG. 13 as an example, a case where bending stress with deflection to the substrate 26 is generated is considered. In this case, as shown in FIG. 13 as an example, the stress relaxing member 28 relaxes stress transmitted from the substrate 26. Specifically, rigidity increases with the stress relaxing member 28 provided on the substrate 26 to relax stress. For example, the stress relaxing member 28 has rigidity equal to the IC chip 52 or equal to or higher than the IC chip 52. The stress relaxing member 28 has rigidity equal to or higher than the substrate 26, for example. That is, in a region of the substrate 26 where the stress relaxing member 28 is provided, deformation of the substrate 26 itself is suppressed. As a result, generation of stress to the IC chip 52 with deformation of the substrate 26 is suppressed.

As described above, in the cartridge memory 19 according to the second modification example, the stress relaxing member 28 is provided at the position corresponding to the whole of the IC chip 52 in plan view of the IC chip 52. Therefore, according to this configuration, deformation itself of the substrate 26 is suppressed, such that stress in the IC chip 52 due to deformation of the substrate 26 is relaxed, compared to a case where the stress relaxing member 28 is provided at a position corresponding to a part of the IC chip 52.

Third Modification Example

In the above-described embodiment, although a form example where the stress relaxing member 28 is provided at the position corresponding to the whole of the IC chip 52 in plan view of the IC chip 52 has been described, the technique of the present disclosure is not limited thereto. For example, as shown in FIG. 14 as an example, the stress relaxing member 28 may be provided at a position corresponding to an outer peripheral portion of the IC chip 52.

Figure 14:
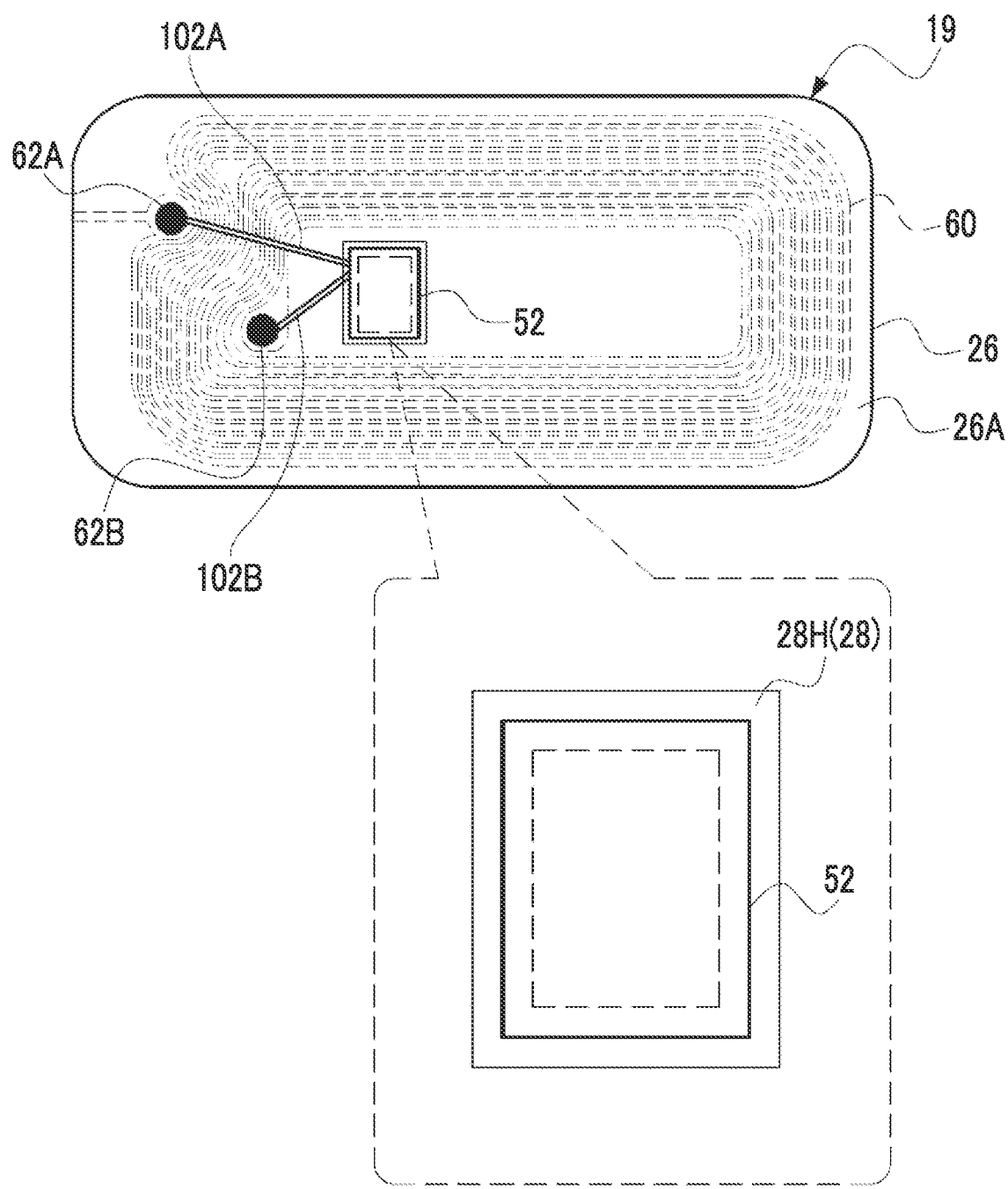
FIG. 14 is a top view showing an example of a front surface structure of a cartridge memory according to a modification example.

As shown in FIG. 14 as an example, a stress relaxing member 28H is formed in a quadrangular frame shape. The stress relaxing member 28H is formed along the outer peripheral portion of the IC chip 52 in plan view of the IC chip 52. That is, the stress relaxing member 28 supports the outer peripheral portion of the IC chip 52. While a width of the stress relaxing member 28H is not particularly limited, such a width that a region including the outer peripheral portion of the IC chip 52 can be supported should be set.

The stress relaxing member 28 relaxes stress transmitted from the substrate 26. Specifically, rigidity increases with the stress relaxing member 28 provided on the substrate 26 to relax stress. For example, the stress relaxing member 28 has rigidity equal to the IC chip 52 or equal to or higher than the IC chip 52. The stress relaxing member 28 has rigidity equal to or higher than the substrate 26, for example. That is, in a region of the substrate 26 where the stress relaxing member 28 is provided, deformation of the substrate 26 itself is suppressed. As a result, generation of stress to the IC chip 52 with deformation of the substrate 26 is suppressed. Since the stress relaxing member 28 has a quadrangular frame shape, in other words, the stress relaxing member 28 is not formed in an inside portion of the quadrangular frame. Accordingly, deformation of the substrate 26 is not excessively suppressed.

As described above, in the cartridge memory 19 according to the third modification example, the stress relaxing member 28H is provided at the position corresponding to the outer peripheral portion of the IC chip 52 in plan view of the IC chip 52. Therefore, according to this configuration, deformation itself of the substrate 26 is suppressed, such that stress in the IC chip 52 due to deformation of the substrate 26 is relaxed, compared to a case where the stress relaxing member 28H is provided at a position corresponding to a part of the outer peripheral portion of the IC chip 52.

In the third modification example, although a form example where the stress relaxing member 28H is formed in a continuous quadrangular frame shape has been described, the technique of the present disclosure is not limited thereto. For example, the stress relaxing member 28H may have a discontinuous quadrangular frame shape.

In the above-described embodiment, although a form example where the stress relaxing member 28 has a quadrangular shape has been described, the technique of the present disclosure is not limited thereto. For example, the stress relaxing member 28 may have a quadrangular shape in which a corner portion is chamfered or may have a polygonal shape, a circular shape, or an annular shape other than the quadrangle in plan view.

In the above-described embodiment, although a form example where copper foil is employed as the coil 60 has been described, the technique of the present disclosure is not limited thereto. For example, other kinds of conductive materials, such as aluminum foil, may be used as the coil 60. In this case, other kinds of conductive materials, such as aluminum foil, that form the coil 60 are employed as the stress relaxing member 28.

The content of the above description and the content of the drawings are detailed description of portions according to the technique of the present disclosure, and are merely examples of the technique of the present disclosure. For example, the above description relating to configuration, function, operation, and advantageous effects is description relating to an example of configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact communication medium for a recording medium cartridge comprising:
   a substrate;
   an IC chip that is electrically connected to one end and the other end of an antenna coil formed on the substrate and configured to induce power with application of a magnetic field from an outside; and
   a stress relaxing member that is provided between the IC chip and the substrate and that relaxes stress transmitted from the substrate,
   wherein the stress relaxing member is formed of metal and formed as a print pattern.

2. The noncontact communication medium for a recording medium cartridge according to claim 1,
   wherein the metal is the same metal that forms the antenna coil.

3. The noncontact communication medium for a recording medium cartridge according to claim 1,
   Wherein the metal is copper or a copper alloy.

4. The noncontact communication medium for a recording medium cartridge according to claim 1,
   wherein the IC chip has a quadrangular shape in plan view, and
   the stress relaxing member is provided at positions corresponding to four corners of the IC chip in plan view of the IC chip.

5. The noncontact communication medium for a recording medium cartridge according to claim 1,
   wherein the IC chip has a quadrangular shape in plan view, and
   the stress relaxing member is provided along opposite sides of the IC chip in plan view of the IC chip.

6. The noncontact communication medium for a recording medium cartridge according to claim 1,
   wherein the stress relaxing member is provided at a position corresponding to a whole of the IC chip in plan view of the IC chip.

7. The noncontact communication medium for a recording medium cartridge according to claim 1,
   wherein the stress relaxing member is provided at a position corresponding to an outer peripheral portion of the IC chip in plan view of the IC chip.

8. The noncontact communication medium for a recording medium cartridge according to claim 1,
   wherein the IC chip has a storage capacity of equal to or greater than 32 kB.

9. The noncontact communication medium for a recording medium cartridge according to claim 1, wherein a ratio of a maximum outer shape dimension of the IC chip to a long side dimension of the substrate is equal to or greater than 25%.

10. The noncontact communication medium for a recording medium cartridge according to claim 1, wherein the substrate is a flexible substrate.

11. A recording medium cartridge comprising:
the noncontact communication medium for a recording medium cartridge according to claim 1.

12. A method for manufacturing a noncontact communication medium for a recording medium cartridge, the method comprising:
forming a stress relaxing member on a substrate as a print pattern, which relaxes stress transmitted from the substrate and which is formed of metal; and
mounting an IC chip electrically connectable to one end and the other end of an antenna coil formed on the substrate and configured to induce power with application of a magnetic field from an outside, on the substrate through the stress relaxing member.

13. A noncontact communication medium for a recording medium cartridge comprising:
a substrate;
an IC chip that is electrically connected to one end and the other end of an antenna coil formed on the substrate and configured to induce power with application of a magnetic field from an outside; and
a stress relaxing member that is provided between the IC chip and the substrate and that relaxes stress transmitted from the substrate,
wherein the IC chip has a storage capacity of equal to or greater than 32 kB.

14. A noncontact communication medium for a recording medium cartridge comprising:
a substrate;
an IC chip that is electrically connected to one end and the other end of an antenna coil formed on the substrate and configured to induce power with application of a magnetic field from an outside; and
a stress relaxing member that is provided between the IC chip and the substrate and that relaxes stress transmitted from the substrate,
wherein a ratio of a maximum outer shape dimension of the IC chip to a long side dimension of the substrate is equal to or greater than 25%.

* * * * *